United States Patent
Shen et al.

(10) Patent No.: US 10,148,596 B2
(45) Date of Patent: Dec. 4, 2018

(54) DATA FLOW STATISTICS COLLECTION METHOD, SYSTEM, AND APPARATUS

(71) Applicant: Huawei Technologies Co., Ltd., Shenzhen (CN)

(72) Inventors: Weifeng Shen, Hangzhou (CN); Xiuchu Zhao, Hangzhou (CN); Xiaobo Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 15/274,511

(22) Filed: Sep. 23, 2016

(65) Prior Publication Data
US 2017/0012902 A1 Jan. 12, 2017

Related U.S. Application Data

(63) Continuation of application No. PCT/CN2014/074016, filed on Mar. 25, 2014.

(51) Int. Cl.
*H04L 12/935* (2013.01)
*H04L 12/741* (2013.01)
(Continued)

(52) U.S. Cl.
CPC ...... *H04L 49/3009* (2013.01); *H04L 12/6418* (2013.01); *H04L 41/142* (2013.01);
(Continued)

(58) Field of Classification Search
CPC . H04L 49/3009; H04L 43/026; H04L 45/745; H04L 41/142; H04L 45/54; H04L 12/6418
See application file for complete search history.

(56) References Cited

U.S. PATENT DOCUMENTS

2007/0115850 A1* 5/2007 Tsuchiya ............... H04L 43/022
370/252
2012/0155467 A1* 6/2012 Appenzeller ........... H04L 45/54
370/392
(Continued)

FOREIGN PATENT DOCUMENTS

| CN | 101075911 A | 11/2007 |
|---|---|---|
| CN | 103314557 A | 9/2013 |
| WO | 2014040240 A1 | 3/2014 |

OTHER PUBLICATIONS

'OpenFlow Switch Specification,' Open Networking Foundation, Version 1.2 (Wire Protocol 0x03), ONF TS-003, Dec. 5, 2011, 85 pages.
(Continued)

*Primary Examiner* — Ivan O Latorre
(74) *Attorney, Agent, or Firm* — Conley Rose, P.C.

(57) ABSTRACT

A data flow statistics collection method, a switch, and a controller. The data flow statistics collection method includes recording first identification information and second identification information in the first flow entry if a part of fields in a data packet match a flow entry and the flow entry is the last flow entry corresponding to the to-be-counted flow object, where the first identification information identifies that the first part of fields match the first flow entry and the second identification information identifies that at least one second part of fields in the data packet respectively match a second flow entry in at least one second flow table. The data flow statistics collection method also includes performing, in the first flow entry, statistics collection on the to-be-counted flow object, and recording statistical information of the to-be-counted flow object. In this way, statistics collection on the to-be-counted flow object is implemented.

8 Claims, 9 Drawing Sheets

(51) Int. Cl.
*H04L 12/26* (2006.01)
*H04L 12/64* (2006.01)
*H04L 12/24* (2006.01)

(52) U.S. Cl.
CPC ............ *H04L 43/026* (2013.01); *H04L 45/54* (2013.01); *H04L 45/745* (2013.01)

(56) References Cited

U.S. PATENT DOCUMENTS

| | | | | |
|---|---|---|---|---|
| 2012/0300615 | A1* | 11/2012 | Kempf | H04W 24/02 370/216 |
| 2013/0010600 | A1* | 1/2013 | Jocha | H04L 43/026 370/236.2 |
| 2013/0064243 | A1* | 3/2013 | Akiyoshi | H04L 45/38 370/389 |
| 2013/0114615 | A1* | 5/2013 | Suemitsu | H04L 47/2441 370/401 |
| 2013/0163475 | A1* | 6/2013 | Beliveau | H04L 67/327 370/257 |
| 2013/0304915 | A1* | 11/2013 | Kawai | H04L 43/026 709/224 |
| 2014/0233385 | A1* | 8/2014 | Beliveau | H04L 47/122 370/235 |
| 2014/0269288 | A1* | 9/2014 | Crisan | H04L 47/2425 370/231 |
| 2015/0188770 | A1* | 7/2015 | Naiksatam | H04L 41/0893 370/254 |
| 2016/0154896 | A1* | 6/2016 | Simitsis | G06F 17/30958 707/741 |

OTHER PUBLICATIONS

Foreign Communication From a Counterpart Application, PCT Application No. PCT/CN2014/074016, English Translation of International Search Report dated Dec. 31, 2014, 2 pages.

Foreign Communication From a Counterpart Application, PCT Application No. PCT/CN2014/074016, English Translation of Written Opinion dated Dec. 31, 2014, 10 pages.

"OpenFlow Switch Specification," Version 1.4.0 (Wire Protocol 0x05), Oct. 14, 2013, ONF TS-012, 206 pages.

Foreign Communication From a Counterpart Application, Chinese Application No. 201480000193.9, Chinese Office Action dated Feb. 27, 2018, 7 pages.

* cited by examiner

Flow entry 1 in a flow table 1

| Match field | Counter |
|---|---|
| xx.xx.xx.xx.xx.xx.80 | 30 |
| xx.xx.xx.xx.xx.xx.81 | 40 |

| Metadata |
|---|
| 010000 |
| 000000 |

Flow entry 2 in a flow table 2

| Match field | Counter |
|---|---|
| 192.168.0.3 | 80 |
| 192.168.0.2 | 20 |

| Metadata |
|---|
| 010100 |
| 000000 |

Flow entry 3 in a flow table 3

| Match field | Metadata | Counter |
|---|---|---|
| 80 | 010101 | 10 |
| 8080 | 000000 | 20 |

DATA FLOW STATISTICS COLLECTION METHOD, SYSTEM, AND APPARATUS

CROSS-REFERENCE TO RELATED APPLICATION

This application is a continuation of International Application No. PCT/CN2014/074016, filed on Mar. 25, 2014, which is hereby incorporated by reference in its entirety.

TECHNICAL FIELD

The present disclosure relates to the field of communications technologies, and in particular, to a data flow statistics collection method, system, and apparatus.

BACKGROUND

With development of network technologies and increasing expansion of a network scale, types of network devices and types of services carried on a network gradually increase, which greatly increases possibilities that various faults or performance problems occur on a network. Meanwhile, requirements on user service quality are increasing, and consequently, difficulty of network management increases. A network traffic analysis system is configured to monitor network devices and network operation traffic to find abnormal conditions on a network in time so as to warn a network administrator to take necessary measures to ensure normal network operation.

OpenFlow is a protocol for implementing software defined networking (SDN), and a basic idea of an OpenFlow network is to separate a data forwarding plane from a control plane. An OpenFlow switch is responsible for data forwarding on the data plane, and a controller implements a function of the control plane. The switch communicates with the controller using the OpenFlow protocol, and the controller manages the switch using the OpenFlow protocol. The OpenFlow switch is mainly responsible for data forwarding. After receiving a data packet, the OpenFlow switch matches the data packet with a flow entry in a flow table, and forwards the data packet according to the flow entry if the data packet matches the flow entry. The OpenFlow switch has a single counter field in each flow entry, where the counter field is used to count a data packet that matches a flow entry. Therefore, statistics collection on a data flow can be supported definitely.

A structure of multiple flow tables is introduced to the OpenFlow 1.2 version and later versions, where a switch includes one or more flow tables used for level-be-level query and forwarding, and one data flow is forwarded after matching is performed level by level between multiple flow tables and the data flow, which implements flow table compression. However, the following problems are caused inevitably: each data flow is forwarded after matching is performed between a combination of flow entries in multiple flow tables and the data flow, and each flow entry is not targeted for a single data flow any longer. Therefore, complete information of a single data flow cannot be obtained from a flow table, that is, statistical data of the data flow cannot be acquired from a counter field in a flow entry.

SUMMARY

Embodiments of the present disclosure provide a data flow statistics collection method, system, and apparatus, which implement mutual combination of statistical information.

A first aspect of the embodiments of the present disclosure provides a data flow statistics collection method, applied to statistics collection performed, by a switch using a received data packet, on a to-be-counted flow object, where the method includes matching a first part of fields in the data packet with a first flow entry in a first flow table; if the first part of fields match the first flow entry, the first flow entry is the last flow entry corresponding to the to-be-counted flow object, and a global statistical identifier includes at least one piece of second identification information, recording first identification information and the at least one piece of second identification information in the first flow entry; and performing, in the first flow entry, statistics collection on the to-be-counted flow object, and recording statistical information of the to-be-counted flow object, where the first identification information is used to identify that the first part of fields match the first flow entry, and the at least one piece of second identification information is used to identify that at least one second part of fields in the data packet respectively match a second flow entry in at least one second flow table.

In a first possible implementation manner of the first aspect of the embodiments of the present disclosure, the method further includes recording the first identification information in the global statistical identifier if the first part of fields match the first flow entry and the first flow entry is not the last flow entry corresponding to the to-be-counted flow object.

With reference to the first aspect of the embodiments of the present disclosure or the first possible implementation manner of the first aspect, in a second possible implementation manner of the first aspect of the embodiments of the present disclosure, before the matching a first part of fields in the data packet with a first flow entry in a first flow table, the method further includes receiving configuration information that is for performing statistics collection on the to-be-counted flow object and that is sent by a controller, where the configuration information includes at least two flow entries corresponding to the to-be-counted flow object and identification information that respectively matches the at least two flow entries.

With reference to the second possible implementation manner of the first aspect of the embodiments of the present disclosure, in a third possible implementation manner of the first aspect of the embodiments of the present disclosure, the method further includes receiving a query request sent by the controller, where the query request includes the identification information corresponding to the to-be-counted flow object; and querying the first flow table for the first flow entry corresponding to the identification information included in the query request, and sending the statistical information in the first flow entry to the controller.

With reference to the first aspect of the embodiments of the present disclosure or any possible implementation manner of the first to third possible implementation manners of the first aspect, in a fourth possible implementation manner of the first aspect of the embodiments of the present disclosure, the recording the first identification information in the global statistical identifier includes adding the first identification information and the at least one piece of second identification information into an attribute of metadata in the first flow entry.

A second aspect of the embodiments of the present disclosure provides a data flow statistics collection method, including determining, by a controller according to characteristic information of a to-be-counted flow object, at least two flow entries corresponding to the to-be-counted flow object; determining, by the controller, identification information that respectively matches flow entries of the at least two flow entries; and sending, by the controller to a switch, configuration information that is for performing statistics collection on the to-be-counted flow object, where the configuration information includes the at least two flow entries and the identification information that respectively matches the flow entries of the at least two flow entries so that the switch performs, according to the at least two flow entries and the identification information that matches the flow entries, statistics collection on the to-be-counted flow object.

In a first possible implementation manner of the second aspect of the embodiments of the present disclosure, the method further includes sending, by the controller, a query request to the switch, where the query request includes the identification information corresponding to the to-be-counted flow object; and receiving, by the controller, statistical information in a first flow entry that is found by the switch according to the query request, where the identification information included in the query request is recorded in the first flow entry.

A third aspect of the embodiments of the present disclosure provides a data flow statistics collection apparatus, used for statistics collection performed, using a received data packet, on a to-be-counted flow object, where the apparatus includes a matching unit configured to match a first part of fields in the data packet with a first flow entry in a first flow table; a recording unit configured to, if the first part of fields on which matching is performed by the matching unit match the first flow entry, the first flow entry is the last flow entry corresponding to the to-be-counted flow object, and a global statistical identifier includes at least one piece of second identification information, record first identification information and the at least one piece of second identification information in the first flow entry, where the first identification information is used to identify that the first part of fields match the first flow entry, and the at least one piece of second identification information is used to identify that at least one second part of fields in the data packet respectively match a second flow entry in at least one second flow table; and a statistics collection unit configured to perform, in the first flow entry, statistics collection on the to-be-counted flow object, and record statistical information of the to-be-counted flow object.

In a first possible implementation manner of the third aspect of the embodiments of the present disclosure, the recording unit is further configured to record the first identification information in the global statistical identifier if the first part of fields on which matching is performed by the matching unit match the first flow entry and the first flow entry is not the last flow entry corresponding to the to-be-counted flow object.

With reference to the third aspect of the embodiments of the present disclosure or the first possible implementation manner of the third aspect, in a second possible implementation manner of the third aspect of the embodiments of the present disclosure, the apparatus further includes a configuration receiving unit configured to receive configuration information that is for performing statistics collection on the to-be-counted flow object and that is sent by a controller, where the configuration information includes at least two flow entries corresponding to the to-be-counted flow object and identification information that respectively matches the at least two flow entries.

With reference to the second possible implementation manner of the third aspect of the embodiments of the present disclosure, in a third possible implementation manner of the third aspect of the embodiments of the present disclosure, the apparatus further includes a query receiving unit configured to receive a query request sent by the controller, where the query request includes the identification information corresponding to the to-be-counted flow object; and a statistics collection sending unit configured to: query the first flow table for the first flow entry corresponding to the identification information included in the query request received by the query receiving unit, and send the statistical information in the first flow entry to the controller.

With reference to the third aspect of the embodiments of the present disclosure or any possible implementation manner of the first to third possible implementation manners of the third aspect, in a fourth possible implementation manner of the third aspect of the embodiments of the present disclosure, the recording unit is configured to add the first identification information and the at least one piece of second identification information into an attribute of metadata in the first flow entry.

A fourth aspect of the embodiments of the present disclosure provides a controller, including a flow-entry determining unit configured to determine, according to characteristic information of a to-be-counted flow object, at least two flow entries corresponding to the to-be-counted flow object; an identifier determining unit configured to determine identification information that respectively matches flow entries of the at least two flow entries determined by the flow-entry determining unit; and a configuration sending unit configured to send, to a switch, configuration information that is for performing statistics collection on the to-be-counted flow object, where the configuration information includes the at least two flow entries determined by the flow-entry determining unit and the identification information that respectively matches the flow entries of the at least two flow entries and that is determined by the identifier determining unit so that the switch performs, according to the at least two flow entries and the identification information that respectively matches the flow entries, statistics collection on the to-be-counted flow object.

In a first possible implementation manner of the fourth aspect of the embodiments of the present disclosure, the controller further includes a query sending unit configured to send a query request to the switch, where the query request includes the identification information corresponding to the to-be-counted flow object, and a statistics collection receiving unit configured to receive statistical information in a first flow entry that is found by the switch according to the query request sent by the query sending unit, where the identification information included in the query request is recorded in the first flow entry.

A fifth aspect of the embodiments of the present disclosure provides a switch, applied to statistics collection performed, using a received data packet, on a to-be-counted flow object, where the switch includes a processor and a memory that are connected to a bus, where the memory is configured to store an execution instruction, and the processor is configured to communicate with the memory, and execute the execution instruction to enable the switch to perform the following method of matching a first part of fields in the data packet with a first flow entry in a first flow table; if the first part of fields match the first flow entry, the first flow entry is the last flow entry corresponding to the to-be-counted flow object, and a global statistical identifier includes at least one piece of second identification information, recording first identification information and the at least one piece of second identification information in the first flow entry; and performing, in the first flow entry, statistics collection on the to-be-counted flow object, and recording statistical information of the to-be-counted flow object, where the first identification information is used to identify that the first part of fields match the first flow entry, and the at least one piece of second identification information is used to identify that at least one second part of fields in the data packet respectively match a second flow entry in at least one second flow table.

In a first possible implementation manner of the fifth aspect of the embodiments of the present disclosure, the method performed by the switch according to the execution instruction executed by the processor further includes, if the first part of fields match the first flow entry, and the first flow entry is not the last flow entry corresponding to the to-be-counted flow object, recording the first identification information in the global statistical identifier.

With reference to the fifth aspect of the embodiments of the present disclosure or the first possible implementation manner of the fifth aspect, in a second possible implementation manner of the fifth aspect of the embodiments of the present disclosure, the apparatus further includes a receiver that is connected to the bus, where the receiver is configured to receive configuration information that is for performing statistics collection on the to-be-counted flow object and that is sent by a controller, where the configuration information includes at least two flow entries corresponding to the to-be-counted flow object and identification information that respectively matches the at least two flow entries.

With reference to the second possible implementation manner of the fifth aspect of the embodiments of the present disclosure, in a third possible implementation manner of the fifth aspect of the embodiments of the present disclosure, the apparatus further includes a transmitter that is connected to the bus, where the receiver is further configured to receive a query request sent by the controller, where the query request includes the identification information corresponding to the to-be-counted flow object; the method performed by the switch according to the execution instruction executed by the processor further includes querying the first flow table for the first flow entry corresponding to the identification information included in the query request received by the receiver; and the transmitter is configured to send the statistical information in the first flow entry to the controller.

With reference to the fifth aspect of the embodiments of the present disclosure or any possible implementation manner of the first to third possible implementation manners of the fifth aspect, in a fourth possible implementation manner of the fifth aspect of the embodiments of the present disclosure, the method performed by the switch according to the execution instruction executed by the processor includes adding the first identification information and the at least one piece of second identification information into an attribute of metadata in the first flow entry.

A sixth aspect of the embodiments of the present disclosure provides a controller, including a processor, a transmitter, and a memory that is connected to a bus, where the memory is configured to store an execution instruction; the processor is configured to communicate with the memory, and execute the execution instruction to enable the controller to perform the following method of determining, according to characteristic information of a to-be-counted flow object, at least two flow entries corresponding to the to-be-counted flow object; and determining identification information that respectively matches flow entries of the at least two flow entries; and the transmitter is configured to send, to a switch, configuration information that is for performing statistics collection on the to-be-counted flow object, where the configuration information includes the at least two flow entries and the identification information that respectively matches the flow entries of the at least two flow entries so that the switch performs, according to the at least two flow entries and the identification information that respectively matches the flow entries, statistics collection on the to-be-counted flow object.

In a first possible implementation manner of the sixth aspect of the embodiments of the present disclosure, the controller further includes a receiver that is connected to the bus, where the transmitter is further configured to send a query request to the switch, where the query request includes the identification information corresponding to the to-be-counted flow object, and the receiver is configured to receive statistical information in a first flow entry that is found by the switch according to the query request sent by the transmitter, where the identification information included in the query request is recorded in the first flow entry.

A seventh aspect of the embodiments of the present disclosure provides a data flow statistics collection system, including a controller and one or more switches, where the switch is the data flow statistics collection apparatus according to the third aspect of the embodiments of the present disclosure or any possible implementation manner of the first to fourth possible implementation manners of the third aspect, and the controller is the controller according to the fourth aspect of the embodiments of the present disclosure or the first possible implementation manner of the fourth aspect.

An eighth aspect of the embodiments of the present disclosure provides a data flow statistics collection system, including a controller and one or more switches, where the switch is the switch according to the fifth aspect of the embodiments of the present disclosure or any possible implementation manner of the first to fourth possible implementation manners of the fifth aspect, and the controller is the controller according to the sixth aspect of the embodiments of the present disclosure or the first possible implementation manner of the sixth aspect.

It can be seen that, in the embodiments of the present disclosure, if a part of fields in a data packet match a flow entry (for example, a first flow entry) in a flow table, the first flow entry is the last flow entry corresponding to a to-be-counted flow object, and at least one piece of second identification information has been recorded in a global statistical identifier of the data packet, a switch records first identification information and the at least one piece of second identification information in the first flow entry, performs, in the first flow entry, statistics collection on the to-be-counted flow object, and records statistical information of the to-be-counted flow object. In this way, each piece of identification information may be recorded in the last flow entry corresponding to the to-be-counted flow object, to identify a flow object that matches multiple flow entries; and statistics collection is performed on this type of flow object so as to avoid that statistical information in the flow entries of multiple flow tables is separately used for statistics collection on only a data flow that matches the flow entries. Therefore, mutual combination of statistical information is implemented, which helps a controller further analyze data traffic.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate specific order or a specific sequence. It should be understood that the data termed in such a way are interchangeable in proper circumstances so that the embodiments of the present disclosure described herein can be implemented in order except the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
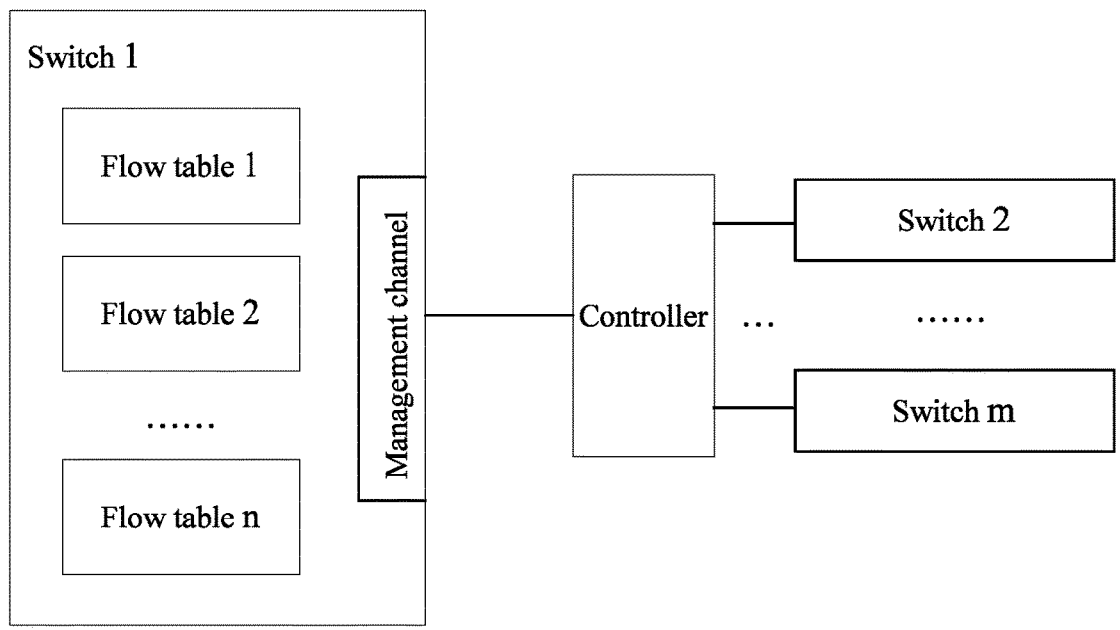
FIG. 1 is a schematic structural diagram of a system applicable to a data flow statistics collection method according to an embodiment of the present disclosure.

First method embodiment of the present disclosure:

A data flow statistics collection method is provided, where the method can be mainly applied to a system shown in FIG. 1. The system may include a controller and at least one switch (m switches in FIG. 1). The controller manages each switch using an OpenFlow data traffic protocol. Structures of the switches are similar to each other, and each switch may include a management channel connected to the controller. Each switch may store multiple flow tables, and each flow table includes at least two flow entries.

Figure 2:
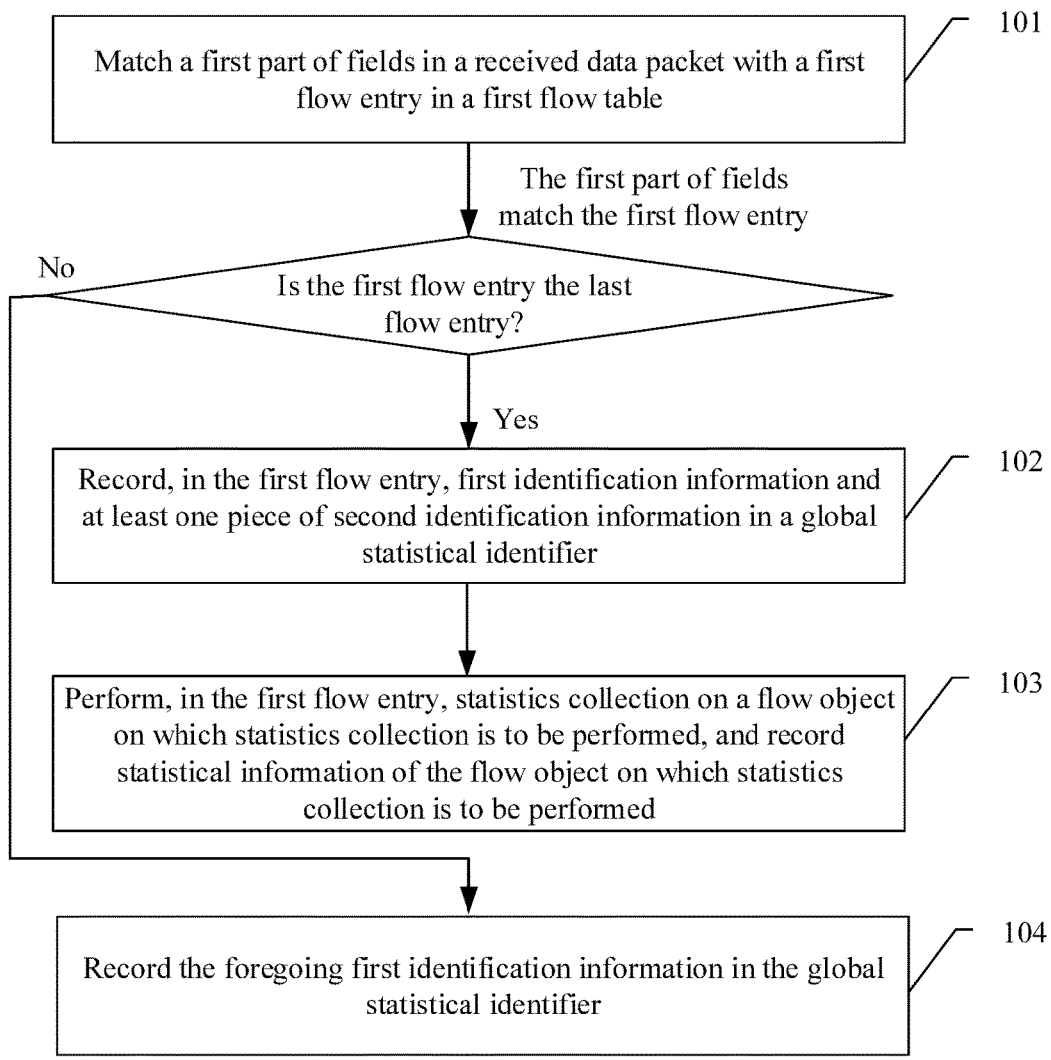
FIG. 2 is a flowchart of a data flow statistics collection method according to a first method embodiment of the present disclosure.

The method in this embodiment is a method performed by a switch, and is mainly a method used by the switch to perform, in a case of multiple flow tables in the switch using a received data packet, statistics collection on a to-be-counted flow object. A flowchart of the method is shown in FIG. 2, and the method includes:

Step 101: Match a first part of fields in a received data packet with a first flow entry in a first flow table. If the first part of fields matches the first flow entry, further determine whether the first flow entry is the last flow entry corresponding to a to-be-counted flow object. If the first part of fields does not match the first flow entry, the switch discards the data packet, and does not perform statistics collection.

It may be understood that the switch may perform, according to configuration performed by the controller, statistics collection on the to-be-counted flow object, for example, perform statistics collection on a flow object whose Media Access Control (MAC) address is xx.xx.xx.xx.xx.xx.80, destination network protocol (IP) address is 192.168.0.3, port is 80, and the like. One or more features of the flow object may be corresponding to one flow entry. Each flow entry may include a match field and a counter, and may further include a priority, a timeout interval, a group of instructions for matching a data packet, a cookie, and the like, where the match field is mainly used to match a data packet, and may include one or more pieces of information such as a port, an address, or a protocol; the priority is mainly used for a process of querying for a flow entry; if multiple flow entries match a query request at the same time, a priority of a flow entry is identified, which is implemented by selecting a flow entry with a highest priority; the counter is used to count a data flow that matches the foregoing match field; an instruction is used to modify an action set or process a pipeline; the timeout interval is a maximum time count or an effective time of a data flow; and the cookie is a non-transparent data value selected by the controller, and used by the controller to perform flow statistical data filtering, flow modification, and flow deletion, but cannot be used when matching is performed on a data packet.

In this embodiment, after receiving the data packet, the switch needs to match each field in the data packet with flow entries corresponding to multiple flow tables stored in the switch. When a field in the data packet matches a first flow entry in a flow table (for example, the first flow table), the switch needs to record first identification information; if any field in the data packet does not match a flow entry, the switch may discard the data packet.

Further, if the first flow entry is the last flow entry corresponding to the to-be-counted flow object, and a global statistical identifier includes at least one piece of second identification information, the switch executes steps 102 and 103; if the first flow entry is not the last flow entry corresponding to the to-be-counted flow object, the switch executes step 104.

The first identification information is used to identify that the first part of fields in the data packet match the first flow entry, and the at least one piece of second identification information is used to identify that at least one second part of fields in the data packet match a second flow entry in at least one second flow table. If the global statistical identifier does not include the at least one piece of second identification information, the switch discards the data packet.

Step 102: Record, in the first flow entry, first identification information and at least one piece of second identification information in a global statistical identifier.

Information used to identify that a part of fields in the data packet match a flow entry may be the same or may be different herein. For example, the foregoing first identification information is 01, and the information used to identify that the second part of fields in the data packet match the second flow entry may be 01, 10, or the like.

Step 103: Perform, in the first flow entry, statistics collection on the to-be-counted flow object, and record statistical information of the to-be-counted flow object. Statistics collection is performed using a counter that is in the first flow entry; that is, adding 1 to a current value of the counter.

Step 104: Record the foregoing first identification information in the global statistical identifier. Further, in this case, the switch may also perform statistics collection using the counter that is in the first flow entry, that is, add 1 to a count value of the counter in the first flow entry.

In a specific implementation manner, when receiving one data packet, the switch sets one corresponding global statistical identifier. The switch uses an attribute of metadata of the data packet as the global statistical identifier, and records each piece of identification information in the global statistical identifier. When the switch performs recording in step 102, the switch may add the foregoing first identification information and at least one piece of second identification information into an attribute of metadata in the first flow entry. In addition, the switch may set N bits in the global statistical identifier, where the bits are used to respectively record pieces of identification information indicating that each field in the data packet respectively matches flow entries corresponding to the to-be-counted flow object, and a value of N is the same as a quantity of the flow entries corresponding to the to-be-counted flow object. It should be noted that, if the data packet is discarded, or the data packet is forwarded from the switch, the global statistical identifier of the data packet is also discarded.

A method used by the switch to perform matching on another second flow entry is similar to the foregoing method used by the switch to perform matching on the first flow entry. A difference lies in that information for processing is different. In this case, the switch performs matching on flow entries of the data packet level by level using multiple flow tables, and records each piece of identification information in a global statistical identifier of the data packet level by level. In this way, each piece of identification information is recorded in the last flow entry corresponding to the to-be-counted flow object. Therefore, it may be identified that each of multiple parts of fields in the data packet respectively match the multiple flow entries corresponding to the to-be-counted flow object, and a counter in the last flow entry may be used to perform statistics collection on a quantity of paths passing through the multiple flow tables.

It can be seen that, in this embodiment, if a part of fields in a data packet match a flow entry (for example, a first flow entry) in a flow table, the first flow entry is the last flow entry corresponding to a to-be-counted flow object, and at least one piece of second identification information has been recorded in a global statistical identifier of the data packet, a switch records first identification information and the at least one piece of second identification information in the first flow entry, performs, in the first flow entry, statistics collection on the to-be-counted flow object, and records statistical information of the to-be-counted flow object. In this way, each piece of identification information may be recorded in the last flow entry corresponding to the to-be-counted flow object, to identify a flow object that matches multiple flow entries; and statistics collection is performed on this type of flow object so as to avoid that statistical information in the flow entries of multiple flow tables is separately used for statistics collection on only a data flow that matches the flow entries. Therefore, mutual combination of statistical information is implemented, which helps a controller further analyze data traffic.

Figure 3:
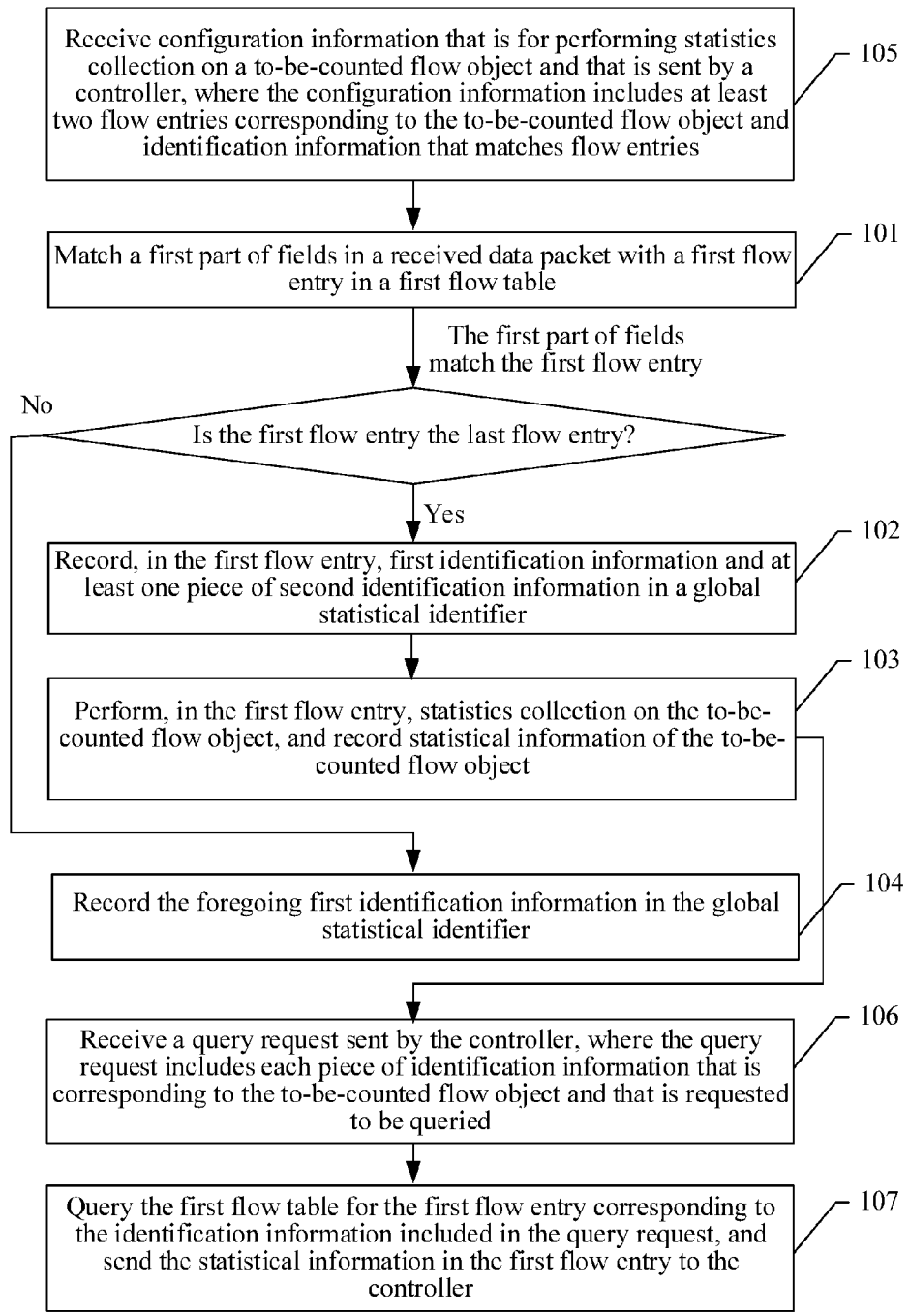
FIG. 3 is a flowchart of another data flow statistics collection method according to the first method embodiment of the present disclosure.

Referring to FIG. 3, in a specific embodiment, the controller mainly requests the switch to perform, in steps 101 to 104, statistics collection on the to-be-counted flow object, and the switch may execute step 105 before executing step 101. After performing the statistics collection on the to-be-counted flow object, the switch may further execute steps 106 and 107 so as to send the statistical information found by the controller to the controller. Details are described as follows.

Step 105: The switch receives configuration information that is for performing statistics collection on the to-be-counted flow object and that is sent by a controller, where the configuration information includes at least two flow entries corresponding to the to-be-counted flow object and identification information that respectively matches flow entries. The identification information that respectively matches the flow entries may be the same or different. For example, identification information that matches the first flow entry is identification information a, and identification information that matches a second flow entry is identification information b, where a and b may be the same or may be different.

Step 106: The switch receives a query request sent by the controller, where the query request includes each piece of identification information that is corresponding to the to-be-counted flow object and that is requested to be queried.

Step 107: The switch queries the first flow table for the first flow entry corresponding to the identification information included in the foregoing query request, and sends the statistical information in the first flow entry to the controller. The switch may send information about the counter in the first flow entry to the controller.

It can be seen that, in steps 105 to 107, the controller may control the switch to perform statistics collection on the to-be-counted flow object, and may also query for the statistical information, which can help the controller further analyze a flow object, on a network, on which statistics collection is to be performed by each switch.

Figure 4:
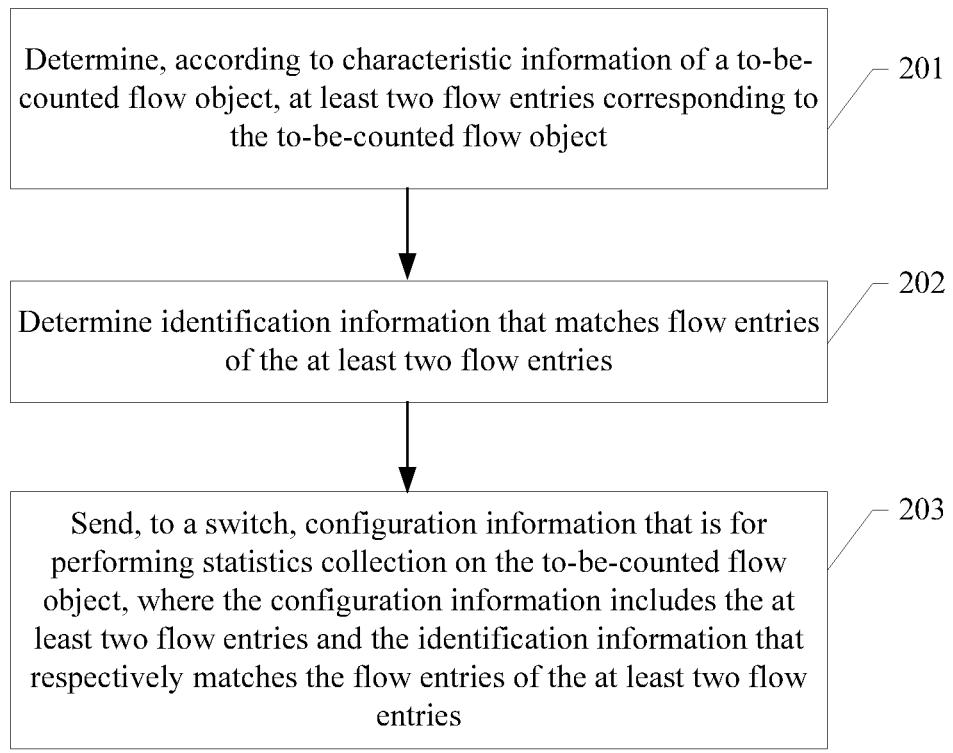
FIG. 4 is a flowchart of a data flow statistics collection method according to a second method embodiment of the present disclosure.

Second method embodiment of the present disclosure:

Another data flow statistics collection method is further provided, where the method is mainly applied to a system shown in FIG. 1, and is mainly a method used by a switch to perform, using a received data packet, statistics collection on a to-be-counted flow object. The method in this embodiment is a method performed by a controller. A flowchart of the method is shown in FIG. 4, and the method includes:

Step 201: The controller determines, according to characteristic information of a to-be-counted flow object, at least two flow entries corresponding to the to-be-counted flow object, where the characteristic information of the to-be-counted flow object may include information such as a MAC address, an IP address, a protocol, or a port.

Step 202: The controller determines identification information that respectively matches flow entries of the foregoing at least two flow entries, where the identification information that respectively matches the flow entries may be the same or may be different herein.

Step 203: The controller sends, to a switch, configuration information that is for performing statistics collection on the to-be-counted flow object, where the configuration information includes the at least two flow entries and the identification information that respectively matches the flow entries of the at least two flow entries. In this way, after receiving the configuration information, the switch may perform, according to the at least two flow entries and the identification information that respectively matches the flow entries, statistics collection on the to-be-counted flow object. The statistics collection may be performed according to the method including steps 101 to 104, and details are not described herein again.

In this embodiment, a controller may send identification information that matches flow entries to a switch, for the switch to perform statistics collection. In this case, the switch may record each piece of identification information in the last flow entry corresponding to a to-be-counted flow object, to identify a flow object that matches multiple flow entries; and perform statistics collection on this type of flow object so as to avoid that statistical information in the flow entries is separately used for statistics collection on only a data flow that matches the flow entries. Therefore, mutual combination of statistical information is implemented, which helps the controller further analyze data traffic.

Figure 5:
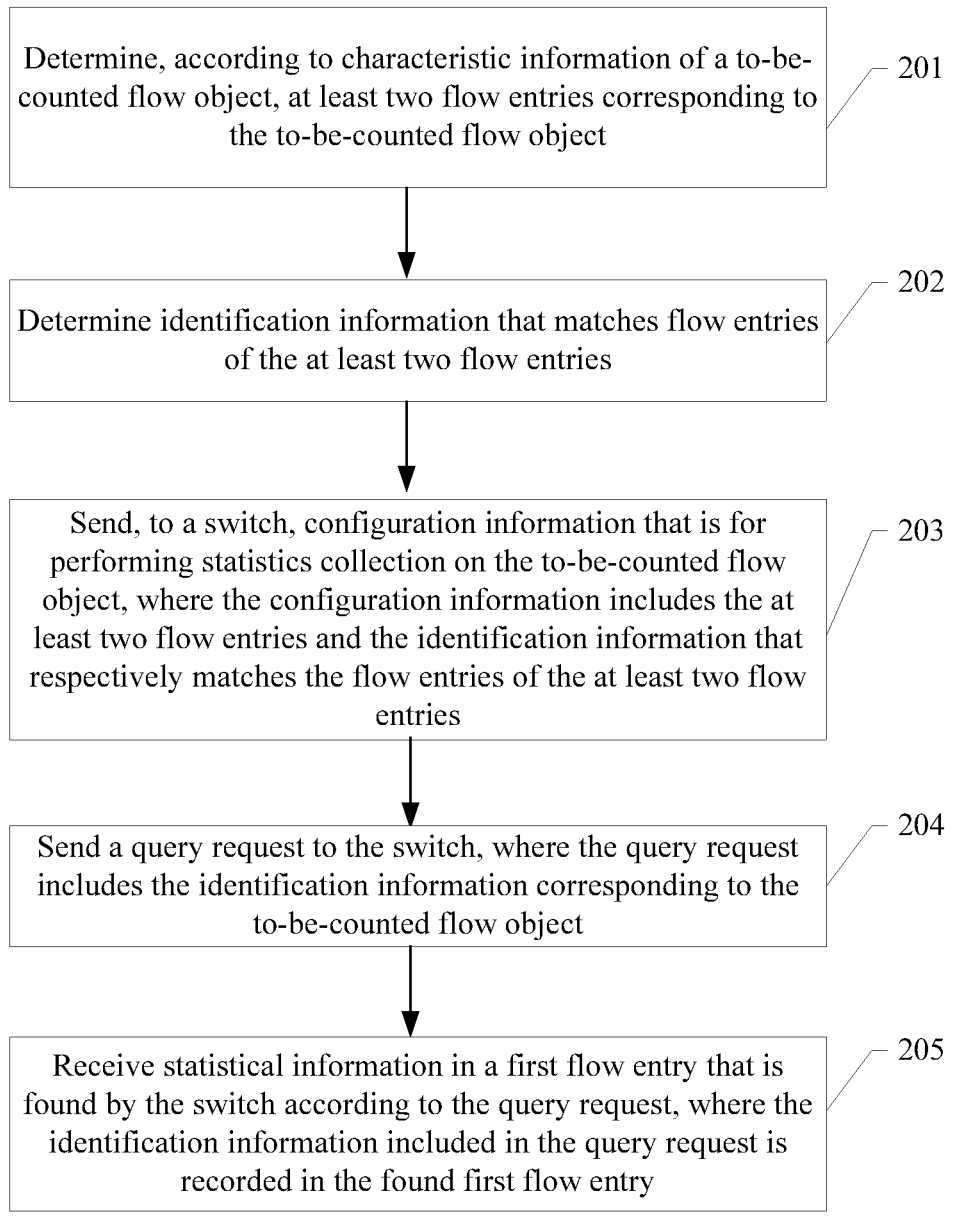
FIG. 5 is a flowchart of another data flow statistics collection method according to the second method embodiment of the present disclosure.

Referring to FIG. 5, in a specific embodiment, in addition to controlling, according to steps 201 to 203, the switch to perform statistics collection on the to-be-counted flow object, the controller may further execute steps 204 and 205 to query for statistical information of a flow object that matches multiple flow entries. Details are described as follows.

Step 204: The controller sends a query request to the switch, where the query request includes the identification information corresponding to the to-be-counted flow object, and the identification information herein may include identification information that indicates that the to-be-counted flow object respectively matches multiple flow entries and that the query request requests to query.

Step 205: The controller receives statistical information in a first flow entry that is found by the switch according to the query request, where the identification information included in the query request is recorded in the found first flow entry.

In steps 204 and 205, the controller may query for the statistical information from the switch, and the found statistical information may include statistical information of the to-be-counted flow object and that matches the multiple flow entries rather than independent statistical information in each flow entry, which can help the controller further analyze a data flow, on a network, on which statistics collection is performed by each switch.

Third method embodiment of the present disclosure:

A specific application example is used to describe a data flow statistics collection method in this embodiment of the present disclosure, where the method can be mainly applied to a system shown in FIG. 1. Details are described as follows.

A controller sends configuration information to a switch, where the configuration information includes three flow entries. Match fields included in the flow entries are respectively: a MAC address xx.xx.xx.xx.xx.xx.80, a destination IP address 192.168.0.3, and a port 80. Structures of the flow entries may be shown in FIG. 6. The configuration information further includes identification information that matches these three flow entries, where all the identification information is 01.

Figures 6, 7:
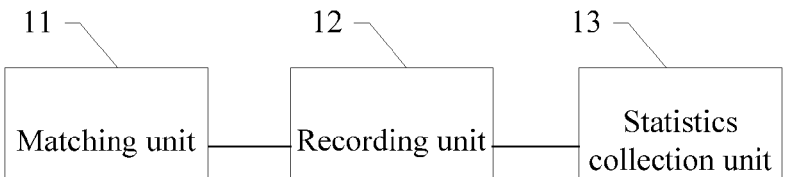
FIG. 6 is a schematic diagram of data flow statistics collection performed by a switch according to a third method embodiment of the present disclosure.
FIG. 7 is a schematic structural diagram of a data flow statistics collection apparatus according to a first device embodiment of the present disclosure.

Referring to FIG. 6, when the switch receives a data packet, the switch first matches a MAC address included in the data packet with a flow entry 1 in a flow table 1. If the MAC address matches the match field xx.xx.xx.xx.xx.xx.80 in the flow entry 1, the switch adds the identification information 01 into a global statistical identifier, for example, an attribute of metadata of the data packet.

The switch matches a destination IP address included in the data packet with a flow entry 2 in a flow table 2. If the destination IP address matches the match field 192.168.0.3 in the flow entry 2, a switch continues to add the identification information 01 into the global statistical identifier.

The switch matches a port included in the data packet with a flow entry 3. If the port matches the match field 80 in the flow entry 3 in a flow table 3, the flow entry 3 is the last flow entry corresponding to a to-be-counted flow object, and the global statistical identifier also includes identification information 0101 that matches both the flow entry 1 and the flow entry 2, the switch adds identification information 010101 into an attribute of metadata in the match field in the flow entry 3. The identification information 010101 includes each piece of identification information that respectively matches the flow entries 1 to 3. In addition, the switch adds 1 to a value of a counter of the match field in the flow entry 3 to perform statistics collection.

In this way, if the controller needs to query for statistical information obtained after the switch performs statistics collection on a flow object, the controller sends a query request to the switch, where the query request includes identification information corresponding to the flow object on which statistics collection needs to be performed, for example, 010101. The switch performs querying in the stored flow table 3, and finds that the flow entry 3 includes the identification information 010101. Then, the switch sends information about the counter in the flow entry to the controller.

First device embodiment of the present disclosure:

A data flow statistics collection apparatus such as a switch is provided, where the apparatus is configured to perform, using a received data packet, statistics collection on a to-be-counted flow object. A schematic structural diagram of the apparatus is shown in FIG. 7, and the apparatus includes a matching unit 11, a recording unit 12, and a statistics collection unit 13.

The matching unit 11 is configured to match a first part of fields in the data packet with a first flow entry in a first flow table.

The recording unit 12 is configured to, if the first part of fields match the first flow entry, the first flow entry is the last flow entry corresponding to the to-be-counted flow object, and a global statistical identifier includes at least one piece of second identification information, record first identification information and the at least one piece of second identification information in the first flow entry, where the first identification information is used to identify that the first part of fields match the first flow entry, and the at least one piece of second identification information is used to identify that at least one second part of fields in the data packet respectively match a second flow entry in at least one second flow table.

It may be understood that, if the first part of fields in the data packet do not match the first flow entry, the recording unit 12 may further discard the data packet. The recording unit 12 may add the first identification information and the at least one piece of second identification information into an attribute of metadata in the first flow entry.

The statistics collection unit 13 is configured to perform, in the first flow entry, statistics collection on the to-be-counted flow object, and record statistical information of the to-be-counted flow object, that is, add 1 to a count value of a counter in the first flow entry.

Further, the foregoing recording unit 12 is further configured to record the first identification information in the global statistical identifier if the first flow entry is not the last flow entry corresponding to the to-be-counted flow object.

In the data flow statistics collection apparatus in this embodiment, if a part of fields, in a data packet, on which matching is performed by a matching unit match a flow entry (for example, a first flow entry) in a flow table, the first flow entry is the last flow entry corresponding to a to-be-counted flow object, and at least one piece of second identification information has been recorded in a global statistical identifier of the data packet, a recording unit records first identification information and the at least one piece of second identification information in the first flow entry; and a statistics collection unit performs, in the first flow entry, statistics collection on the to-be-counted flow object, and records statistical information of the to-be-counted flow object. In this way, each piece of identification information may be recorded in the last flow entry corresponding to the to-be-counted flow object, to identify a flow object that matches multiple flow entries; and statistics collection is performed on this type of flow object so as to avoid that statistical information in the flow entries of multiple flow tables is separately used for statistics collection on only a data flow that matches the flow entries. Therefore, mutual combination of statistical information is implemented, which helps a controller further analyze data traffic.

Figure 8:
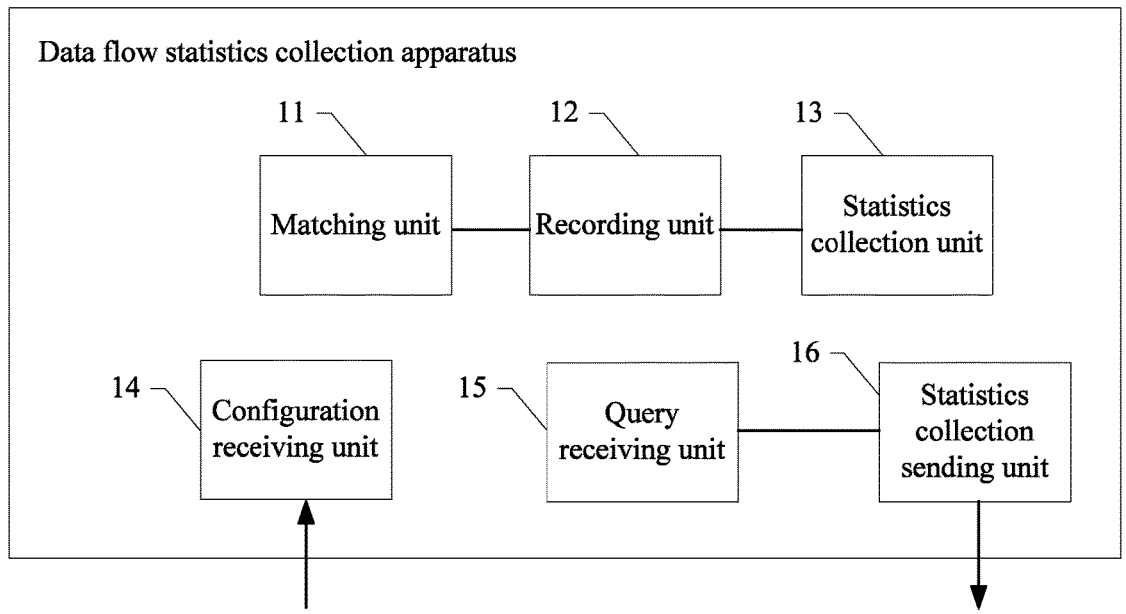
FIG. 8 is a schematic structural diagram of another data flow statistics collection apparatus according to the first device embodiment of the present disclosure.

Referring to FIG. 8, in a specific embodiment, in addition to the structure shown in FIG. 7, the data flow statistics collection apparatus may further include a configuration receiving unit 14, a query receiving unit 15, and a statistics collection sending unit 16, where the configuration receiving unit 14 is configured to receive configuration information that is for performing statistics collection on the to-be-counted flow object and that is sent by a controller, where the configuration information includes at least two flow entries corresponding to the to-be-counted flow object and identification information that respectively matches the at least two flow entries, where the identification information that respectively matches flow entries may be the same or different; the query receiving unit 15 is configured to receive a query request sent by the controller, where the query request includes the identification information corresponding to the to-be-counted flow object; and the statistics collection sending unit 16 is configured to: query the first flow table for the first flow entry corresponding to the identification information included in the query request received by the query receiving unit 15, and send the statistical information in the first flow entry to the controller.

In the apparatus in this embodiment, after the configuration receiving unit 14 receives the configuration information, the recording unit 12 records the first identification information and the at least one piece of second identification information according to the configuration information; and after the query receiving unit 15 receives the query request, the statistics collection sending unit 16 queries the last flow entry that is found and that is corresponding to a flow object, for corresponding statistical information, for example, a value of a counter.

Figure 9:
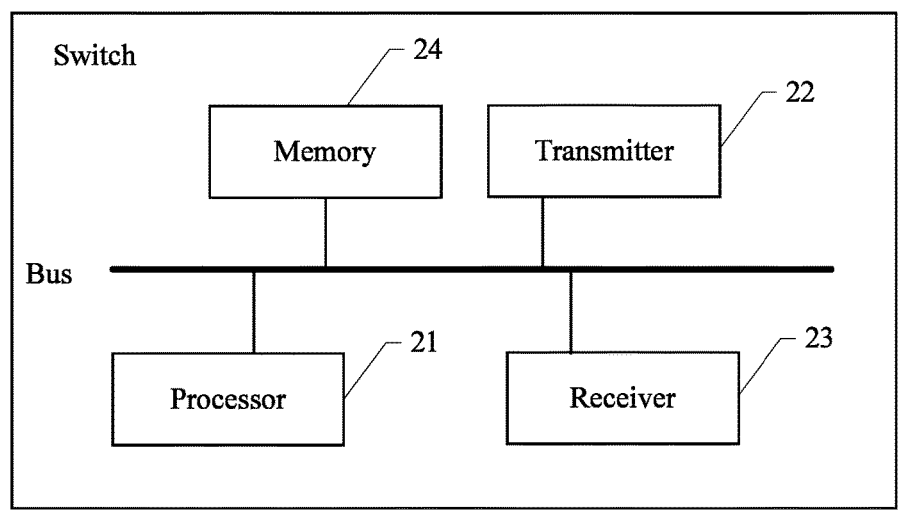
FIG. 9 is a schematic structural diagram of a switch according to a second device embodiment of the present disclosure.

Second device embodiment of the present disclosure:

A switch is provided, where the switch is applied to statistics collection performed, using a received data packet, on a to-be-counted flow object. A schematic structural diagram of the switch is shown in FIG. 9, and the switch may include a processor 21 and a memory 24 that are connected to a bus, and may further include a transmitter 22 and a receiver 23 that are connected to the bus.

The memory 24 is configured to store an execution instruction. The memory 24 is configured to store a program, where the program may include program code, and the foregoing program code includes the execution instruction. The memory 24 is further configured to store data received from the transmitter 22, and may further store information such as a file that is necessary for the processor 21 to process data. The memory 24 may include a high-speed random access memory (RAM), and may further include a non-volatile memory, such as at least one magnetic disk memory. The transmitter 22 and the receiver 23 are ports used by the switch to communicate with another device.

The processor 21 is configured to communicate with the memory 24, and execute the execution instruction to enable the switch to perform the following method: matching a first part of fields in the data packet with a first flow entry in a first flow table; if the first part of fields match the first flow entry, the first flow entry is the last flow entry corresponding to the to-be-counted flow object, and a global statistical identifier includes at least one piece of second identification information, recording first identification information and the at least one piece of second identification information in the first flow entry; and performing, in the first flow entry, statistics collection on the to-be-counted flow object, and recording statistical information of the to-be-counted flow object, that is, adding 1 to a count value of a counter in the first flow entry, where the first identification information is used to identify that the first part of fields match the first flow entry, and the at least one piece of second identification information is used to identify that at least one second part of fields in the data packet respectively match a second flow entry in at least one second flow table. That the processor 21 executes the execution instruction to enable the switch to record the first identification information and the at least one piece of second identification information includes the processor 21 adding the first identification information and the at least one piece of second identification information into an attribute of metadata in the first flow entry.

If the first part of fields in the data packet does not match the first flow entry, the processor 21 executes the execution instruction to enable that the switch may further discard the data packet.

The method performed by the switch according to the execution instruction executed by the processor 21 further includes: if the first part of fields match the first flow entry and the first flow entry is not the last flow entry corresponding to the to-be-counted flow object, recording the first identification information in the global statistical identifier.

It can be seen that, in this embodiment, a processor 21 in the switch executes an execution instruction stored in a memory 24, and may record identification information in the last flow entry corresponding to a to-be-counted flow object, to identify a flow object that matches multiple flow entries, and perform statistics collection on this type of flow object so as to avoid that statistical information in the flow entries is separately used for statistics collection on only a data flow that matches the flow entries. Therefore, mutual combination of statistical information is implemented, which helps a controller further analyze data traffic.

In a specific embodiment, the receiver 23 in the switch is configured to receive configuration information that is for performing statistics collection on the to-be-counted flow object and that is sent by a controller, where the configuration information includes at least two flow entries corresponding to the to-be-counted flow object and identification information that respectively matches the at least two flow entries, where the identification information that respectively matches flow entries may be the same or different. The processor 21 executes the execution instruction to enable the switch to record the first identification information and the at least one piece of second identification information according to the configuration information.

In another specific embodiment, the receiver 23 in the switch is further configured to receive a query request sent by the controller, where the query request includes the identification information corresponding to the to-be-counted flow object. In this case, the method performed by the switch according to the execution instruction executed by the processor 21 further includes querying the first flow table for the first flow entry corresponding to the identification information included in the query request received by the receiver 23. The transmitter 22 is configured to send the statistical information in the first flow entry that is found by the processor 21 to the controller.

Third device embodiment of the present disclosure:

A controller is provided. A schematic structural diagram of the controller is shown in FIG. 10, and the controller includes a flow-entry determining unit 31 configured to determine, according to characteristic information of a to-be-counted flow object, at least two flow entries corresponding to the to-be-counted flow object, where the characteristic information of the to-be-counted flow object may include information such as a MAC address, an IP address, a protocol, or a port; an identifier determining unit 32 configured to determine identification information that respectively matches flow entries of the at least two flow entries determined by the flow-entry determining unit 31, where the identification information that respectively matches the flow entries may be the same or may be different herein; and a configuration sending unit 33 configured to send, to a switch, configuration information that is for performing statistics collection on the to-be-counted flow object, where the configuration information includes the at least two flow entries determined by the flow-entry determining unit 31 and the identification information that respectively matches the flow entries of the at least two flow entries and that is determined by the identifier determining unit 32 so that the switch performs, according to the at least two flow entries and the identification information that respectively matches the flow entries, statistics collection on the to-be-counted flow object.

In the controller in this embodiment, a configuration sending unit may send identification information that respectively matches flow entries to a switch, for the switch to perform statistics collection. In this case, the switch may record the identification information in the last flow entry corresponding to a to-be-counted flow object, to identify a flow object that matches multiple flow entries; and perform statistics collection on this type of flow object so as to avoid that statistical information in the flow entries is separately used for statistics collection on only a data flow that matches the flow entries. Therefore, mutual combination of statistical information is implemented, which helps the controller further analyze data traffic.

Figure 10:
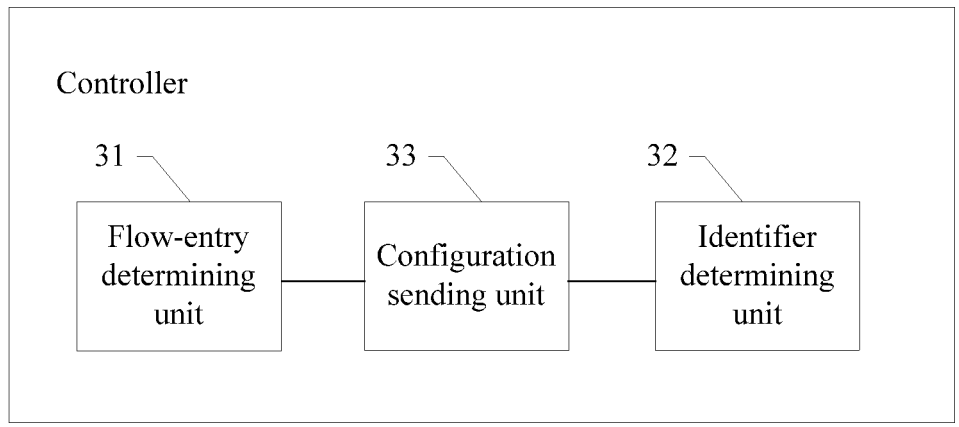
FIG. 10 is a schematic structural diagram of a controller according to a third device embodiment of the present disclosure.
Figure 11:
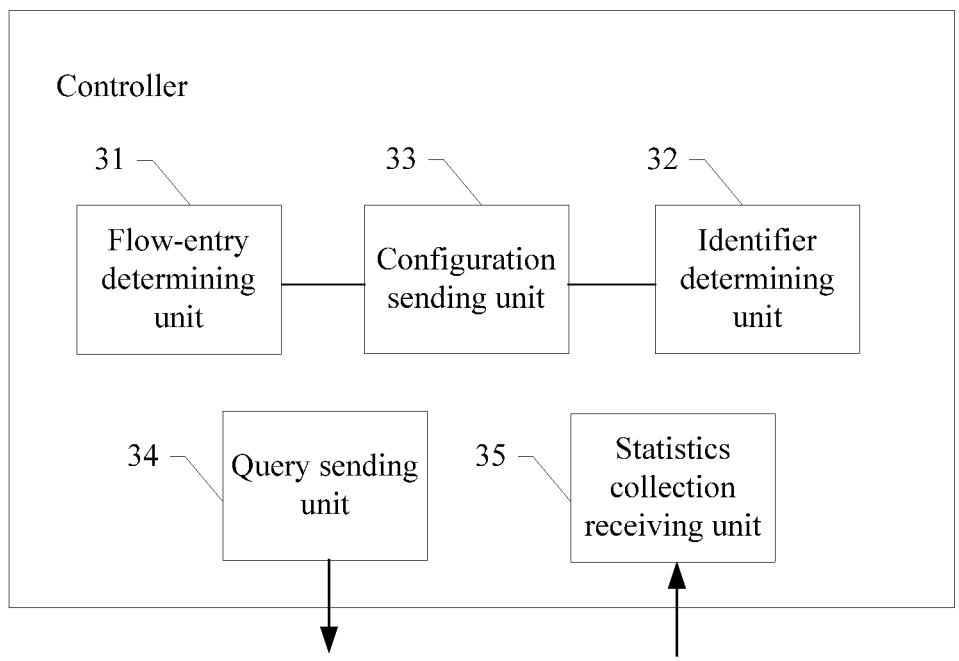
FIG. 11 is a schematic structural diagram of another controller according to the third device embodiment of the present disclosure.

Referring to FIG. 11, in a specific embodiment, in addition to the structure shown in FIG. 10, the controller may further include a query sending unit 34 and a statistics collection receiving unit 35, where the query sending unit 34 is configured to send a query request to the switch, where the query request includes the identification information corresponding to the to-be-counted flow object, and the identification information herein may include identification information that indicates that the to-be-counted flow object matches multiple flow entries and that the query request requests to query; and the statistics collection receiving unit 35 is configured to receive statistical information in a first flow entry that is found by the switch according to the query request sent by the query sending unit 34, where the identification information included in the query request is recorded in the first flow entry.

In this embodiment, a query sending unit may query for statistical information from a switch, and the statistical information received by a statistics collection receiving unit may include statistical information of a flow object that matches multiple flow entries rather than independent statistical information in each flow entry, which can help the controller further analyze a data flow, on a network, on which statistics collection is performed by each switch.

Figure 12:
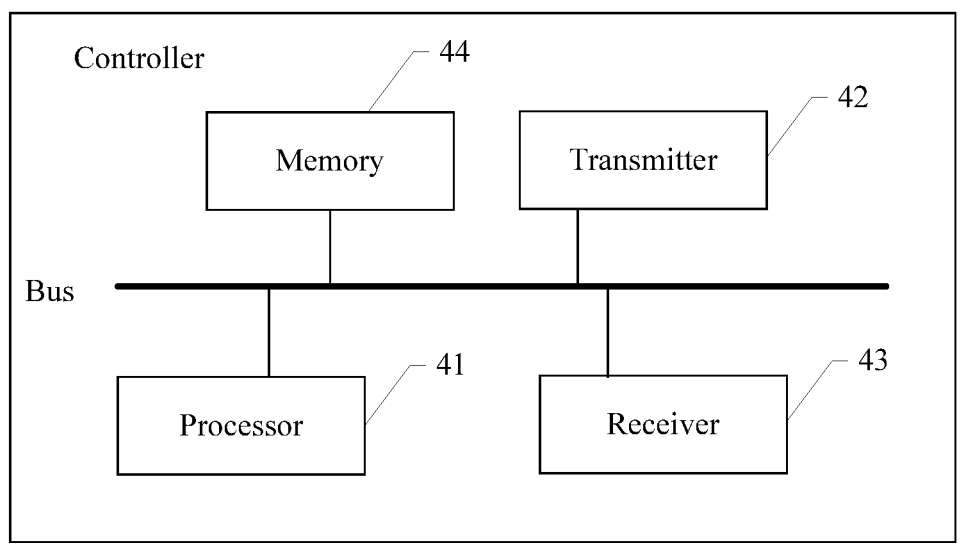
FIG. 12 is a schematic structural diagram of another controller according to a fourth device embodiment of the present disclosure.

Fourth device embodiment of the present disclosure:

A controller is provided. A schematic structural diagram of the controller is shown in FIG. 12, and the controller may include a processor 41 and a memory 44 that are connected to a bus, and may further include a transmitter 42 and a receiver 43 that are connected to the bus.

The memory 44 is configured to store an execution instruction. The memory may store a program, where the program may include program code, and the foregoing program code includes the execution instruction. The memory 44 is further configured to store data received from the transmitter 42, and may further store information such as a file that is necessary for the processor 41 to process data. The memory 44 may include a high-speed RAM memory, and may further include a non-volatile memory, such as at least one magnetic disk memory. The transmitter 42 and the receiver 43 are ports used by a switch to communicate with another device.

The processor 41 is configured to communicate with the memory 44, and execute the execution instruction to enable the controller to perform the following method: determining, according to characteristic information of a to-be-counted flow object, at least two flow entries corresponding to the to-be-counted flow object; and determining identification information that respectively matches flow entries of the at least two flow entries, where the identification information that respectively matches the flow entries may be the same or may be different herein. The transmitter 42 is configured to send, to the switch, configuration information that is for performing statistics collection on the to-be-counted flow object, where the configuration information includes the at least two flow entries and the identification information that matches the flow entries of the at least two flow entries, where the at least two flow entries and the identification information are determined by the controller so that the switch performs, according to the at least two flow entries and the identification information that matches the flow entries, statistics collection on the to-be-counted flow object. In this way, the switch may record identification information in the last flow entry corresponding to the to-be-counted flow object, to identify a flow object that matches multiple flow entries; and perform statistics collection on this type of flow object so as to avoid that statistical information in the flow entries is separately used for statistics collection on only a data flow that matches the flow entries. Therefore, mutual combination of statistical information is implemented, which helps the controller further analyze data traffic.

In a specific embodiment, the transmitter 42 in the controller is further configured to send a query request to the switch, where the query request includes the identification information corresponding to the to-be-counted flow object, and the identification information herein may include identification information that indicates that each piece of characteristic information of the to-be-counted flow object matches multiple flow entries and that the query request requests to query. The receiver 43 is configured to receive statistical information in a first flow entry that is found by the switch according to the query request sent by the transmitter 42, where the identification information included in the query request is recorded in the first flow entry. In this way, the statistical information received by the receiver 43 may include statistical information of a flow object that matches multiple flow entries rather than independent statistical information in each flow entry, which can help the controller further analyze a data flow, on a network, on which statistics collection is performed by each switch.

A system embodiment of the present disclosure further provides a data flow statistics collection system. A schematic structural diagram of the system may be shown in FIG. 1, and the system includes a controller and one or more switches. A structure of the switch may be the same as the structure of the data flow statistics collection apparatus or the switch according to the first device embodiment, and a structure of the controller may be the same as the structure of the controller according to the third device embodiment. Details are not described herein again.

A system embodiment of the present disclosure further provides a data flow statistics collection system. A schematic structural diagram of the system may be shown in FIG. 1, and the system includes a controller and one or more switches. A structure of the switch may be the same as the structure of the data flow statistics collection apparatus or the switch according to the second device embodiment, and a structure of the controller may be the same as the structure of the controller according to the fourth device embodiment. Details are not described herein again.

A person of ordinary skill in the art may understand that all or a part of the steps of the methods in the embodiments may be implemented by a program instructing relevant hardware. The program may be stored in a computer readable storage medium. The storage medium may include a read-only memory (ROM), a RAM, a magnetic disk, or an optical disc.

The data flow statistics collection method, system, and apparatus, the switch, and the controller that are provided in the embodiments of the present disclosure are described in detail above. The principle and implementation manner of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementation manners and application scopes according to the ideas of the present disclosure. Therefore, the content of specification shall not be construed as limitations on the present disclosure.

What is claimed is:

1. A data flow statistics collection method implemented by a switch using a received data packet, comprising:
   matching a first part of a field in the data packet with a first flow entry of a first flow table;
   recording first identification information into an attribute of metadata in a flow table when the first part of the field matches the first flow entry and recording at least one second identification information into the attribute of metadata in the flow table when the first flow entry is a last flow entry associated with a to-be-counted flow object;
   collecting statistics on the to-be-counted flow object in the first flow entry when the first flow entry is the last flow entry for the to-be-counted flow object;
   recording statistical information of the to-be-counted flow object after collecting the statistics on the to-be-counted flow object; and
   recording the first identification information in the attribute of metadata when the first part of the field matches the first flow entry and the first flow entry is not the last flow entry associated with the to-be-counted flow object, the first identification information being used to identify that the first part of the field matches the first flow entry, wherein the attribute of metadata comprises the at least one second identification information, and the at least one second identification information being used to identify that at least one second part of the field in the data packet respectively matches a second flow entry in at least one second flow table.

2. The method of claim 1, wherein before matching the first part of the field in the data packet with the first flow entry in a first flow table, the method further comprises receiving, from a controller, configuration information at least two flow entries in one or more flow tables in the switch, the configuration information including information on the to-be-counted flow object corresponding to the at least two flow entries, and the to-be-counted flow object being used to identify that the field in the received data packet respectively matches the at least two flow entries.

3. The method of claim 2, wherein the method further comprises:
   receiving a query request from a controller, wherein the query request comprises an identification information corresponding to the to-be-counted flow object, and the identification information being used to identify the at least two flow entries that the to-be-counted flow object matches;
   querying the first flow table for the first flow entry corresponding to the identification information that is part of the query request; and
   sending the statistical information in the first flow entry to the controller.

4. The method of claim 1, further comprising adding the first identification information and the at least one second identification information into the attribute of metadata in the first flow entry.

5. A switch configured to collect statistics using a received data packet, comprising:
   a bus;
   a processor coupled to the bus; and
   a memory coupled to the bus and configured to store instructions, wherein the processor is configured to communicate with the memory, and the instructions cause the processor to be configured to:

match a first part of a field in the data packet with a first flow entry in a first flow table;

record first identification information into an attribute of metadata in a flow table when the first part of the field matches the first flow entry and at least one second identification information into the attribute of metadata in the flow table when the first flow entry is a last flow entry associated with a to-be-counted flow object;

perform statistics collection on the to-be-counted flow object in the first flow entry when the first flow entry is the last flow entry associated with the to-be-counted flow object;

record statistical information of the to-be-counted flow object after performing statistics collection on the to-be-counted flow object; and record the first identification information in the attribute of metadata when the first part of the field matches the first flow entry and the first flow entry is not the last flow entry associated with the to-be-counted flow object, the first identification information being used to identify that the first part of the field matches the first flow entry, wherein the attribute of metadata comprises the at least one second identification information, and the at least one second identification information being used to identify that at least one second part of fields in the data packet respectively match a second flow entry in at least one second flow table.

6. The switch of claim 5, further comprising a receiver coupled to the bus, wherein the receiver is configured to receive, from a controller, configuration information for at least two flow entries in one or more flow tables in the switch, the configuration information including information on the to-be-counted flow object corresponding to the at least two flow entries, and the to-be-counted flow object being used to identify that the field in the received data packet -respectively matches the at least two flow entries.

7. The switch of claim 6, further comprising a transmitter coupled to the bus, wherein the receiver is further configured to receive a query request from a controller, wherein the query request comprises the identification information associated with the to-be-counted flow object, the first and the at least one second identification information being used to identify the at least two flow entries that match the information in a to-be-counted flow object, wherein the processor is further configured to query the first flow table for the first flow entry associated with the first and the at least one second identification information, and wherein the transmitter is configured to send the statistical information in the first flow entry to the controller.

8. The switch of claim 5, wherein the instructions further cause the processor to be configured to add the first identification information and the at least one second identification information into the attribute of metadata in the first flow entry.

* * * * *